US012645126B2

(12) United States Patent
Hu et al.

(10) Patent No.: US 12,645,126 B2
(45) Date of Patent: Jun. 2, 2026

(54) PIXEL STRUCTURE, ARRAY SUBSTRATE, DISPLAY PANEL, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Jintang Hu, Beijing (CN); Gang Hua, Beijing (CN); Liguang Deng, Beijing (CN); Min Wang, Beijing (CN); Shaobo Li, Beijing (CN); Pengkai Fan, Beijing (CN); Jinghao Liu, Beijing (CN); Shaokai Su, Beijing (CN); Liangliang Pan, Beijing (CN); Dong Wang, Beijing (CN); Zhe Wang, Beijing (CN); Zixi Qi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 289 days.

(21) Appl. No.: 18/281,679

(22) PCT Filed: Oct. 22, 2021

(86) PCT No.: PCT/CN2021/125536
§ 371 (c)(1),
(2) Date: Sep. 12, 2023

(87) PCT Pub. No.: WO2022/199004
PCT Pub. Date: Sep. 29, 2022

(65) Prior Publication Data
US 2024/0152020 A1 May 9, 2024

(30) Foreign Application Priority Data
Mar. 23, 2021 (CN) ......................... 202110307712.8

(51) Int. Cl.
*G02F 1/1685* (2019.01)
*G02F 1/1676* (2019.01)
*G02F 1/16766* (2019.01)

(52) U.S. Cl.
CPC .......... *G02F 1/1685* (2019.01); *G02F 1/1676* (2019.01); *G02F 1/16766* (2019.01)

(58) Field of Classification Search
CPC ............. G02F 1/136286; G02F 1/1368; G02F 1/134345; G02F 1/13624; G02F 1/13306;
(Continued)

(56) References Cited

U.S. PATENT DOCUMENTS

2013/0032827 A1 2/2013 Moon et al.
2021/0134224 A1 5/2021 He et al.

FOREIGN PATENT DOCUMENTS

CN 103367353 A 10/2013
CN 204065625 U 12/2014
(Continued)

OTHER PUBLICATIONS

CN 202110307712.8 first office action dated Mar. 5, 2025.
PCT/CN2021/125536 international search report.

*Primary Examiner* — Brandi N Thomas
(74) *Attorney, Agent, or Firm* — IPro, PLLC

(57) ABSTRACT

A pixel structure, an array substrate, a display panel and a display device. The pixel structure includes a gate line (10), a data line (20), a gate (30), a first electrode (40), a second electrode (50), and a third electrode (60); the gate (30) is connected to the gate line (10); the first electrode (40) is connected to the data line (20); and the second electrode (50) has a first portion and a second portion that are distributed in the extending direction of the second electrode, wherein the first portion of the second electrode (50) cooperates with the first electrode (40) and the gate (30) to form a first thin film transistor, and the second portion of the second elec- (Continued)

70

60
50
20
40

30    10 trode (50) cooperates with the third electrode (60) and the gate (30) to form a second thin film transistor.

11 Claims, 1 Drawing Sheet

(58) Field of Classification Search
CPC ......... G02F 2201/123; G02F 1/134336; G02F 1/1362; G09G 3/3648; G09G 2300/0426; G09G 3/36; G09G 2300/0452; G09G 3/3685; G09G 2310/0218; G09G 3/3233; G09G 3/3611
See application file for complete search history.

(56) References Cited

FOREIGN PATENT DOCUMENTS

| | | | | |
|----|-------------|---|---------|------------------|
| CN | 104317126 A |   | 1/2015  |                  |
| CN | 104409514 A |   | 3/2015  |                  |
| CN | 106206430 A |   | 12/2016 |                  |
| CN | 107167943   | * | 9/2017  | ......... G02F 1/13306 |
| CN | 208208761 U |   | 12/2018 |                  |
| CN | 110596987 A |   | 12/2019 |                  |
| CN | 110648629 A |   | 1/2020  |                  |
| CN | 112925144 A |   | 6/2021  |                  |
| CN | 215067650 U |   | 12/2021 |                  |
| KR | 20020028007 A |  | 4/2002  |                  |

* cited by examiner

1

PIXEL STRUCTURE, ARRAY SUBSTRATE, DISPLAY PANEL, AND DISPLAY DEVICE

CROSS REFERENCE TO RELATED APPLICATION

This application is a national phase entry under 35 U.S.C § 371 of International Application No. PCT/CN2021/125536, filed Oct. 22, 2021, which claims the priority to Chinese Patent Application No. 202110307712.8, filed with the China National Intellectual Property Administration on Mar. 23, 2021 and entitled "PIXEL STRUCTURE, ARRAY SUBSTRATE, DISPLAY PANEL, AND DISPLAY DEVICE", which is incorporated in its entirety herein by reference.

TECHNICAL FIELD

The present disclosure relates to the technical field of display, and particularly relates to a pixel structure, an array substrate, a display panel, and a display device.

BACKGROUND

The development of display technology is fueling people's demand for display devices. Currently, pixels of conventional electronic paper are double-gate thin film transistors (TFTs), and there is no indium tin oxide (ITO, i.e., a transparent thin film conductive layer) covering the top of the TFT, so an ITO gap here is large, causing a low aperture ratio of the pixels and leading to undesirable display effects.

SUMMARY

The present application provides a pixel structure, which may effectively improve an aperture ratio of a pixel and improve a display effect.

In order to achieve the above objective, the present application provides a pixel structure, including a gate line, a data line, a gate, a first electrode, a second electrode and a third electrode;

the gate is connected with the gate line, and the first electrode is connected with the data line;

the second electrode has a first portion and a second portion that are distributed in an extending direction of the second electrode;

the first portion of the second electrode cooperates with the first electrode and the gate, to form a first thin film transistor; and the second portion of the second electrode cooperates with the third electrode and the gate, to form a second thin film transistor.

Preferably, the gate line is arranged in a column direction, the second electrode is arranged in the column direction, the first electrode and the third electrode are located at the same side of the second electrode, the first electrode and the second electrode are arranged in a row direction, and the second electrode and the third electrode are arranged in the row direction.

Preferably, the gate is arranged in a row direction, the second electrode is arranged in the row direction, the first electrode and the second electrode are arranged in a column direction, and the second electrode and the third electrode are arranged in the column direction.

Preferably, the pixel structure further includes a pixel electrode, and the third electrode is connected with the pixel electrode.

Preferably, the gate line has a protrusion toward a side of the pixel electrode, and the protrusion and a body portion of the gate line form the gate.

Preferably, a gap between the first electrode and the second electrode is 6 μm-12 μm.

Preferably, a width of the second electrode is 12 μm-14 μm.

The present application further provides an array substrate, including a plurality of pixel structures above, and the plurality of pixel structures are distributed in an array. Beneficial effects produced by the array substrate are the same as the beneficial effects of the pixel structure, which will not be repeated herein.

The present application further provides a display panel, including a plurality of pixel structures above, and the plurality of pixel structures are distributed in an array.

The present application further provides a display device, including a plurality of pixel structures above, and the plurality of pixel structures are distributed in an array. Beneficial effects produced by the display device are the same as the beneficial effects of the pixel structure, which will not be repeated herein.

Figure 1:
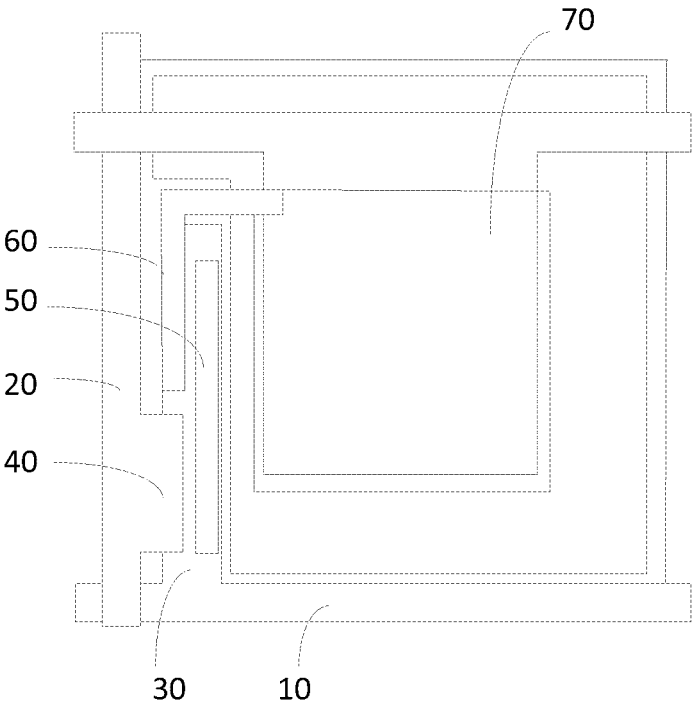
FIG. 1 is a schematic structural diagram of a pixel structure according to an embodiment of the present application.

Reference numerals: 10—gate line; 20—data line; 30—gate; 40—first electrode; 50—second electrode; 60—third electrode; and 70—pixel electrode.

DETAILED DESCRIPTION

The technical solutions of the embodiments of the present disclosure are clearly and completely described below with reference to the drawings. Apparently, the described embodiments are merely some embodiments rather than all embodiments of the present disclosure. Based on the embodiments of the present disclosure, all other embodiments acquired by those of ordinary skill in the art without making creative efforts fall within the scope of protection of the present disclosure.

The embodiments of the present application provides a pixel structure, including a gate line 10, a data line 20, a gate 30, a first electrode 40, a second electrode 50 and a third electrode 60.

The gate 30 is connected with the gate line 10, and the first electrode 40 is connected with the data line 20.

The second electrode 50 has a first portion and a second portion that are distributed in an extending direction of the second electrode.

The first portion of the second electrode 50 cooperates with the first electrode 40 and the gate 30, to form a first thin film transistor.

The second portion of the second electrode 50 cooperates with the third electrode 60 and the gate 30, to form a second thin film transistor.

According to the pixel structure in the present application, the second electrode 50 has a first portion and a second portion that are distributed in the extending direction of the second electrode, the first portion cooperates with the first electrode 40 and the gate 30, to form a first thin film transistor, and the second portion cooperates with the third electrode 60 and the gate 30, to form a second thin film transistor. That is, a first thin film transistor and a second thin film transistor are arranged on one gate 30. In this way, compared with two gates 30 in the prior art, a metal area occupied by the gate 30 may be effectively compressed, to improve the aperture ratio of a pixel, and improve the display effect.

It is to be noted that the first electrode 40 and the third electrode 60 may both be sources or drains, and the second electrode 50 may be a drain or a source.

In a possible embodiment, with reference to FIG. 1, the gate line 10 is arranged in a column direction. The second electrode 50 is arranged in the column direction. The first electrode 40 and the third electrode 60 are located at the same side of the second electrode 50. The first electrode 40 and the second electrode 50 are arranged in a row direction. The second electrode 50 and the third electrode 60 are arranged in the row direction. In this arrangement manner, the gate 30 is arranged in the column direction, and the first thin film transistor and the second thin film transistor may be formed by the gate 30, the first electrode 40, the second electrode 50 and the third electrode 60, so as to guarantee features of the apparatus itself. Portions of the first electrode 40 and the third electrode 60 corresponding to the second electrode 50 are located at the same side of the second electrode 50, such that metal areas of the gate 30, the first electrode 40, the second electrode 50 and the third electrode 60 may be effectively compressed, so as to improve the aperture ratio of the pixel structure and improve the display effect of the pixel structure. Specifically, when the gate 30 is arranged in the column direction, the aperture ratio of the pixel structure may be increased from 75.01% to 78.06%.

Figure 2:
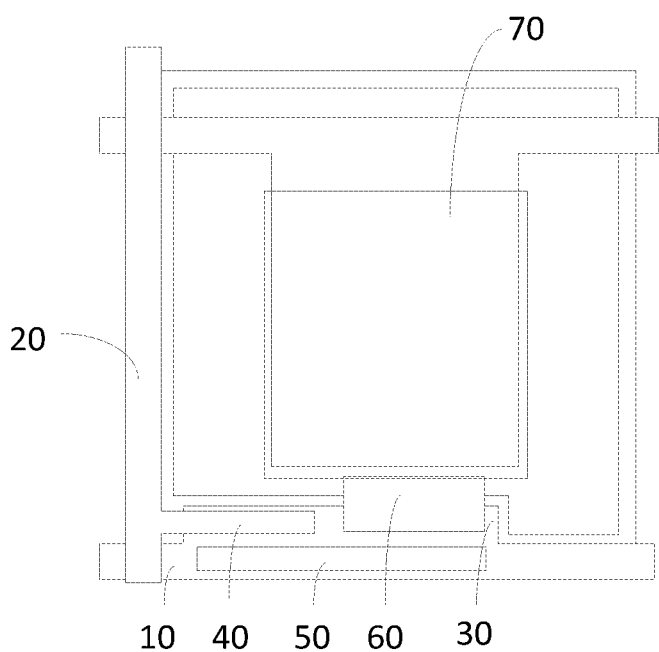
FIG. 2 is another schematic structural diagram of a pixel structure according to an embodiment of the present application.

In a possible embodiment, with reference to FIG. 2, the gate 30 is arranged in a row direction, the second electrode 50 is arranged in the row direction, the first electrode 40 and the second electrode 50 are arranged in a column direction, and the second electrode 50 and the third electrode 60 are arranged in the column direction. In this arrangement manner, the gate 30 is arranged in the row direction, and the first thin film transistor and the second thin film transistor may be formed by the gate 30, the first electrode 40, the second electrode 50 and the third electrode 60, so as to guarantee features of the apparatus itself. Portions of the first electrode 40 and the third electrode 60 corresponding to the second electrode 50 are located at the same side of the second electrode 50, such that metal areas of the gate 30, the first electrode 40, the second electrode 50 and the third electrode 60 may be effectively compressed, to improve the aperture ratio of the pixel structure and improve the display effect of the pixel structure.

It is to be noted that when the gate 30 is arranged in the row direction, the gate 30 may be formed by a protrusion formed on a side of the gate line 10 toward the pixel electrode 70 and a body portion of the gate line 10. In this way, the area occupied by the gate 30 may be reduced by utilizing the gate line 10. The first thin film transistor and the second thin film transistor are arranged side by side, and an orthographic projection of the second electrode shared by the first thin film transistor and the second thin film transistor on a substrate at least partially overlaps an orthographic projection of the gate line 10 on the substrate. Preferably, as shown in FIG. 2, the orthographic projection of the second electrode shared by the first thin film transistor and the second thin film transistor on the substrate layer falls within the orthographic projection of the gate line 10 on the substrate layer. The second electrode is arranged at an inherent space between two adjacent pixel structures, such that an area ratio of the first thin film transistor and the second thin film transistor is effectively reduced. The aperture ratio of a pixel is significantly improved from 75.01% to 82.30%.

In a particular implementation process, the pixel structure further includes a pixel electrode 70, and the third electrode 60 is connected with the pixel electrode 70.

In a possible embodiment, a gap between the first electrode 40 and the second electrode 50 is 6 μm-12 μm. A width of the second electrode 50 is 12 μm-14 μm. The particular size needs to be adjusted according to actual situations, and this arrangement manner may effectively reduce a space occupied by the first thin film transistor and the second thin film transistor, to improve the aperture ratio.

In the above embodiments, a conventional 4Mask process is still used, and the aperture ratio of the pixel structure is effectively improved without changing a connection relation.

The present application further provides an array substrate, including a plurality of pixel structures above, and the plurality of pixel structures are distributed in an array. Beneficial effects produced by the array substrate are the same as the beneficial effects of the pixel structure, which will not be repeated herein.

The present application further provides a display panel, including a plurality of pixel structures above, and the plurality of pixel structures are distributed in an array. As the aperture ratio of the pixel structure is increased and the display effect is enhanced, the display effect of the display panel is improved.

The present application further provides a display device, including a plurality of pixel structures above, and the plurality of pixel structures are distributed in an array. Beneficial effects produced by the display device are the same as the beneficial effects of the pixel structure, which will not be repeated herein.

Apparently, those skilled in the art can make various modifications and variations to the present disclosure without departing from the spirit and scope of the present disclosure. In this way, if the modifications and variations to the present disclosure fall within the scope of claims of the present disclosure and their equivalents, the present disclosure also intends to include these modifications and variations.

What is claimed is:

1. A pixel structure, comprising:
a gate line, a data line, a gate, a first electrode, a second electrode and a third electrode; wherein
the gate is connected with the gate line, and the first electrode is connected with the data line;
the second electrode has a first portion and a second portion that are distributed in an extending direction of the second electrode;
the first portion of the second electrode cooperates with the first electrode and the gate, to form a first thin film transistor; and
the second portion of the second electrode cooperates with the third electrode and the gate, to form a second thin film transistor;
wherein the first thin film transistor and the second thin film transistor share a same gate;
wherein the gate line has a protrusion toward a side of the pixel electrode, and the protrusion and a body portion of the gate line connected with the protrusion form the gate; and wherein an orthographic projection of the second electrode on a substrate layer is within an orthographic projection of the gate line on the substrate layer.

2. The pixel structure according to claim 1, wherein portions of the first electrode and the third electrode corresponding to the second electrode are located at a same side of the second electrode.

3. The pixel structure according to claim 2, wherein the gate is arranged in a column direction, the second electrode is arranged in the column direction, the first electrode and the second electrode are arranged in a row direction, and the second electrode and the third electrode are arranged in the row direction.

4. The pixel structure according to claim 3, further comprising a pixel electrode, wherein the third electrode is connected with the pixel electrode; and the portions of the first electrode and the third electrode corresponding to the second electrode are located at a side, away from the pixel electrode, of the second electrode.

5. The pixel structure according to claim 2, wherein the gate is arranged in a row direction, the second electrode is arranged in the row direction, the first electrode and the second electrode are arranged in a column direction, and the second electrode and the third electrode are arranged in the column direction.

6. The pixel structure according to claim 5, further comprising a pixel electrode, wherein the third electrode is connected with the pixel electrode; and the portions of the first electrode and the third electrode corresponding to the second electrode are located at a side, close to the pixel electrode, of the second electrode.

7. The pixel structure according to claim 1, wherein a gap between the first electrode and the second electrode is 6 μm-12 μm.

8. The pixel structure according to claim 2, wherein a width of the second electrode is 12 μm-14 μm.

9. An array substrate, comprising a plurality of pixel structures according to claim 1, wherein the plurality of pixel structures are distributed in an array.

10. A display panel, comprising a plurality of pixel structures according to claim 1, wherein the plurality of pixel structures are distributed in an array.

11. A display device, comprising a plurality of pixel structures according to claim 1, wherein the plurality of pixel structures are distributed in an array.

\* \* \* \* \*